UNITED STATES PATENT OFFICE.

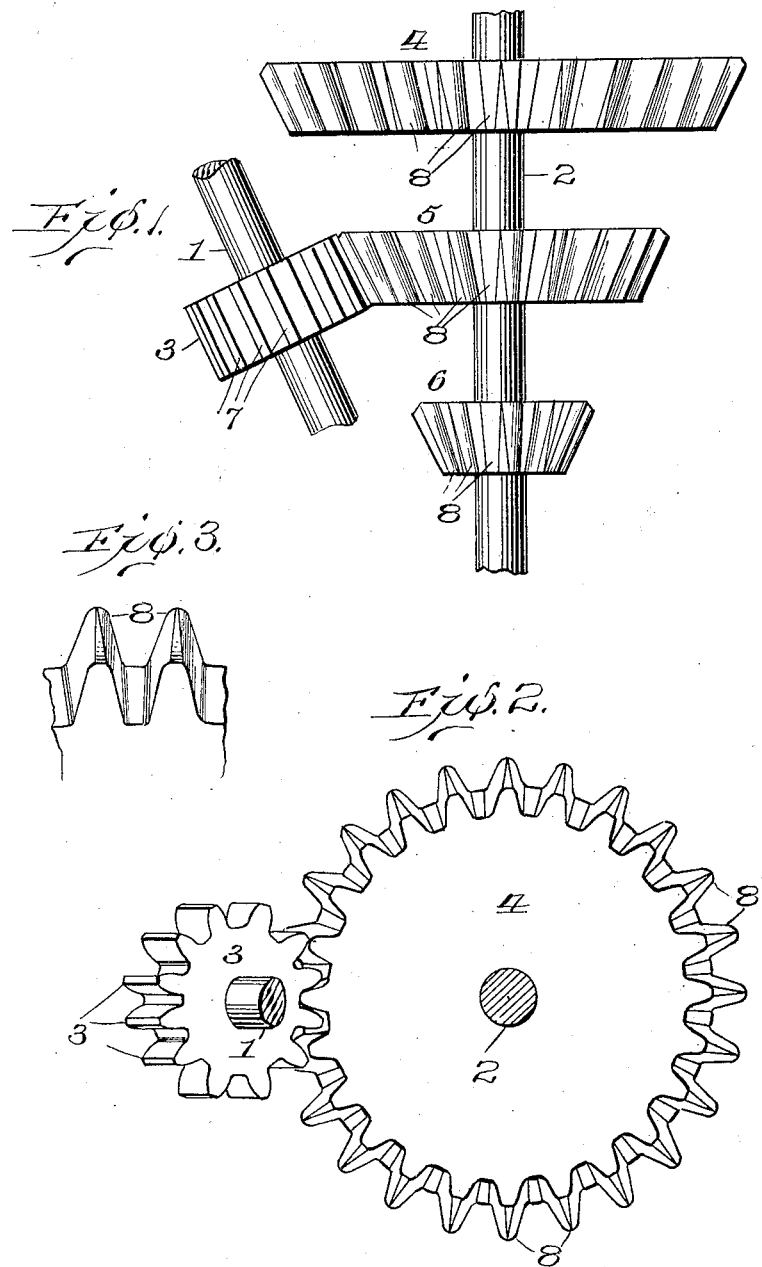

BENJAMIN F. SEYMOUR, OF DENVER, COLORADO.

GEAR.

1,329,807.  Specification of Letters Patent.  Patented Feb. 3, 1920.

Original application filed September 9, 1913, Serial No. 788,837. Divided and this application filed December 7, 1917. Serial No. 205,933.

*To all whom it may concern:*

Be it known that I, BENJAMIN F. SEYMOUR, a citizen of the United States, residing at Denver, in the county of Denver and State of Colorado, have invented new and useful Improvements in Gears, of which the following is a specification.

This invention relates to gearing and particularly to gears for use in change-speed transmissions, such as are used in automobile and machine-tool drives and the like.

This application is a division of Ser. No. 788,837, filed Sept. 9, 1913, and is for the purpose of protecting the novel gear, *per se*, which is described therein.

The gear, which constitutes the subject matter of the present application, has a conical pitch surface like a bevel gear but, unlike the latter, the teeth are of uniform thickness from front to rear, so that they can mesh with a spur gear the axis of which converges toward that of the gear. Therefore, a change-speed transmission may comprise two or more of the gears of different diameters on one shaft and one driving pinion slidably mounted on another shaft, the axis of which is parallel to the pitch cone of the gears. The pinion can slide into mesh with each of the gears and out of mesh on the opposite side.

The essential feature of the new gear is that, while the teeth are cut on a conical blank, their sides do not converge, as do the sides of the teeth of bevel gears, but are parallel, that is, a linear element on one side of a tooth is parallel, throughout the length of the tooth to the corresponding linear element on the other side of the tooth, the corresponding ends of said elements being at the same distances from the axis of the gear.

The invention is illustrated in its preferred form in the accompanying drawing, in which, Figure 1 is a plan view of a change-speed drive comprising three of the new gears and one driving spur pinion.

Fig. 2 is a front elevation of a gear in mesh with the pinion, and,

Fig. 3 is an enlarged fragmentary view of the gear.

1 represents the shaft on which the pinion 3 is slidably keyed, and 2 the convergent shaft on which the gears 4, 5 and 6 are fixed. As shown, the teeth 7 of the pinion are ordinary involute teeth, which form is the best suited for the purposes of my invention.

The teeth 8 of the gear are cut, as stated, in a blank the perimeter of which is a cone, the apex angle of which, when the gear is to mesh with a spur pinion, is equal to twice the angle between the axes of the two shafts. The gear teeth must of course be conjugate to those of the pinion that is, in the present case, must be involute teeth. For convenience in cutting them they may be made of the shape of involute rack teeth. which is that of a truncated triangle. The preferred form is that illustrated in the drawing, and is given to the teeth by first cutting inverted truncated V shaped grooves and then taking a second cut with the same tool traveling at an angle to its path in the first cut so as to progressively remove metal from the sides of the teeth from the front to the rear, leaving the teeth of equal thickness throughout. A cut is then taken with a concave nosed tool starting from the front corner of the truncated V and progressively removing metal from the working face so as to round it off in a curve like that of an involute gear tooth at the rear. A slight sliding contact takes place between the teeth of the pinion and those of the gear at this point, that is. toward the rear end of the gear teeth where they are rounded off, before the true rolling contact commences, this being necessitated by the fact that the sides of the spaces between the gear teeth diverge toward the rear while the sides of the spaces between the pinion teeth are parallel.

What I claim is:

1. The combination with two shafts the axes of which are convergent, of conjugate toothed gears thereon adapted to be slid into and out of mesh with each other from either direction. the working faces of the teeth of one of said gears being reduced in thickness progressively throughout their length from front to rear.

2. A conical gear adapted to mesh with a spur gear, the teeth of said conical gear having at their front ends the shape of an involute rack tooth and at their rear ends the shape of an involute gear tooth.

3. A conical gear adapted to slide into and out of mesh in either direction with a conjugate gear having its axis at an angle to the axis of said conical gear, the teeth of the latter being of the shape of involute rack teeth with their working faces progressively rounded off from front to rear.

4. A conical gear adapted to mesh with a spur gear and having each tooth of substantially uniform thickness between its working faces from front to rear measured in any conical surface concentric with the pitch surface, and having its said working faces progressively reduced in thickness from front to rear.

In testimony whereof I have hereunto set my hand.

BENJAMIN F. SEYMOUR.